Feb. 21, 1967      YOICHI SAKITA ET AL      3,304,801
STEERING WHEEL OF AN AUTOMOBILE AND THE LIKE
EQUIPPED WITH A CIGARETTE GAS LIGHTER
Filed June 8, 1964
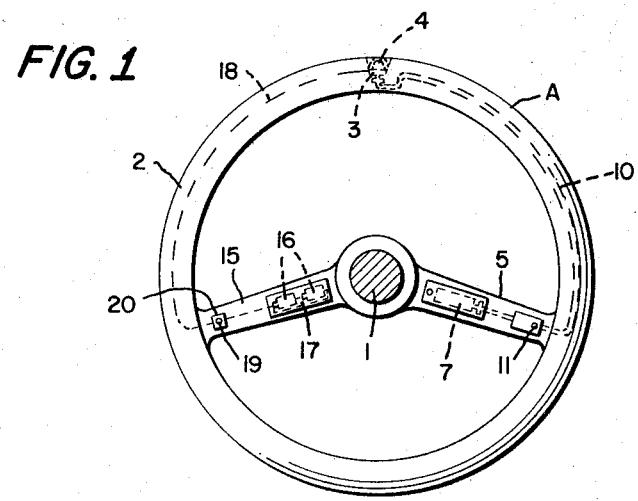
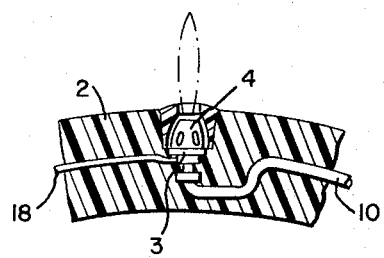
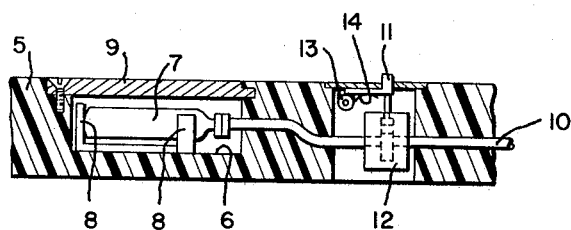
INVENTORS
YOICHI SAKITA
MASAMI MARUTA
BY Wendenoth, Lind & Ponack
ATTORNEYS

United States Patent Office 3,304,801
Patented Feb. 21, 1967

3,304,801
STEERING WHEEL OF AN AUTOMOBILE AND THE LIKE EQUIPPED WITH A CIGARETTE GAS LIGHTER
Yoichi Sakita, 5807 1-chome, Higashi-Momotani, and Masami Maruta, 49 1-chome, Matsuda-cho, both of Osaka, Japan
Filed June 8, 1964, Ser. No. 373,292
Claims priority, application Japan, Dec. 30, 1963, 39/52
2 Claims. (Cl. 74—552)

The present invention relates to a steering wheel of an automobile equipped with a cigarette gas lighter; more particularly it relates to a steering wheel of an automobile or the like having mounted therein a fuel gas nozzle and a heater circuit for lighting the fuel gas jetting out of the said nozzle, the valve of the gas nozzle and the switch for the heater being positioned on the said wheel so that the driver of the car can light the cigarette gas lighter while driving the car without letting go his hold on the steering wheel, whereby he can light his cigarette with ease and in safety.

For a more detailed description of the invention, reference will now be made to the accompanying drawings wherein:

FIGURE 1 is a plan view of an embodiment of the invention, in which the steering wheel shaft is shown in cross section;

FIGURE 2 is an enlarged sectional view of a part of the steering wheel of FIG. 1 and showing the nozzle and FIGURE 3 is an enlarged sectional view of a part of the steering wheel of FIG. 1 and having the fuel gas bomb.

In the above-mentioned drawings, the letter A denotes the steering wheel fixed to its shaft in the automobile and in the upper middle of the rim 2 of the said steering wheel are provided the fuel gas nozzle 3 and the electric heater circuit 4 that can light the fuel gas jetting out of the said nozzle.

In the spoke 5 on one side of the steering wheel is formed a recess 6, wherein are positioned holding members 8 in which is removably mounted a liquefied fuel gas container 7, while over the recess 6 is removably mounted a cover 9 for freely opening and closing the recess. The said container 7 and the nozzle 3 are connected by means of a gas pipe 10 embedded in the spoke 5 and the rim 2, and at some point along the said gas pipe 10 is provided the valve 12 which can be operated by the operation lever 11 of a push-button system mounted on the spoke 5. The said valve 12 is usually held in its closed position by means of a spring 14 fixed to the pivoting section 13 of the said operation lever 11, while the exterior end of the said lever 11 projects beyond the surface of the spoke 5.

Likewise in the other spoke 15 is formed a second recess, wherein is mounted a holder for the removable batteries 16 for a source of power for the heater 14. The said recess 16 is closed by a removable cover 17. The batteries 16 and the heater 4 are connected by the conductor 18 embedded in the rim 2 and the spoke 15. In the said conductor is provided a switch 20 which is operated by the operation lever 19 arranged in the spoke 15.

In addition to the above-mentioned operation levers, such a safety device as a switch or valve which disconnects the power source or shuts off the fuel gas can be provided to be used when the gas lighter is not in use. It is preferable to use as the heater 4 a carbon ignition system instead of a Nichrome wire which is liable to break. As for the conductor 18 and gas pipe 10, the wiring and piping will be preferably included when the steering wheel A is formed.

Because the steering wheel is provided with the cigarette gas lighter as above-mentioned, the driver can light his cigarette easily while his hands are kept on the steering wheel as follows:

First he takes a cigarette in his mouth, while one of his hands holds the steering wheel and then, with both hands resting on the steering wheel A, the operation levers 11 and 19 will be pressed down by the fingers on the respective hands, so that the valve 12 is opened to allow the fuel gas in the container 7 to reach the gas nozzle 3 through the gas pipe 10, while at the same time the switch 20 is closed to feed the electric current from the batteries 16 to the heater 4 through the conductor 18 so as to make the said heater 4 become red-hot, whereby the fuel gas jetting out of the gas nozzle 3 will be ignited. The driver will then bring his face near the steering wheel A to contact the tip of the cigarette with the flame to light it. As soon as the said operation levers 11 and 19 are released, the valve 12 is closed and the switch 20 is opened, so that the fuel gas stops flowing out of the nozzle 3 and the heater 4 is turned off.

Thus according to the present invention, the driver can light his cigarette with both of his hands resting upon the steering wheel except when taking out a cigarette. As a result, in comparison with the conventional device, he can light his cigarette with far greater safety.

Since the conventional cigarette gas lighter is positioned at a point remote steering from the wheel, he must reach out one of his hands towards it and light the cigarette while casting a glance at it without paying attention to road for a moment, which might possible entail a serious accident on a highway. By contrast, according to the invention, the driver can quickly light his cigarette with ease and in safety with both of his hands kept on the steering wheel A by merely bringing his face near the steering wheel while steadily gazing forward of the vehicle.

In the accompanying drawings, the gas nozzle 3 and the heater 4 are positioned on the rim 2. But their positions may be changed. For instance, they may be located at the middle part of the steering wheel A. Likewise the operation lever 11 of the push button system, which controls the valve 12 located between the fuel gas container 7 and the gas nozzle 3, and the operation lever 19 of the push button system of the switch 20 in the conductor 18, which connects the batteries 16 and the heater 4, can be placed at one point, so that the gas nozzle 3 and the heater 4 may be put into action by merely pressing a single button. In addition to being used in an automobile, the present invention can be used in steering wheels in other types of vehicles. For instance, it can be used in a motor boat.

While a preferred embodiment of the invention has been described above in detail, it is understood that numerous modifications might be resorted to without departing from the scope of the invention as set forth in the following claims:

What is claimed:
1. In combination, a steering wheel, a combustible gas storage container removably mounted in said steering wheel, a source of current removably mounted in said steering wheel, a combustible gas burning cigarette lighter mounted in said steering wheel in the portion thereof which is normally at the top of the steering wheel when the steering wheel is in a position to steer the vehicle straight, said cigarette lighter having an electric ignition element, electrical conductor means embedded in said steering wheel and extending between the said source of current and said cigarette lighter, electric switch means in said electrical conductor means and positioned adjacent a point where one hand of a driver would normally grasp the steering wheel, gas conduit means embedded in said steering wheel and extending between said gas storage container and said lighter, and valve means in said gas conduit means and positioned adjacent a point where the other hand of a driver would normally grasp the steering wheel.

2. The combination as claimed in claim 1 in which said steering wheel includes at least two radial spokes joining the rim of the steering wheel at aproximately the 120° and 240° positions, the source of current being in one spoke and the switch means being in said one spoke adjacent the rim of the wheel, and the gas storage container being in the other spoke and the valve means being in said other spoke adjacent the rim of the wheel.

References Cited by the Examiner

UNITED STATES PATENTS

| 1,544,913 | 7/1925 | Lanctot | 219—67 |
| 2,535,452 | 12/1950 | Quercia et al. | 67—4.1 |

FRED C. MATTERN, JR., *Primary Examiner.*

MILTON KAUFMAN, *Examiner.*

J. PUFFER, *Assistant Examiner.*